(No Model.)  2 Sheets—Sheet 1.
W. H. CRAIG.
STEAM ENGINE GOVERNOR.
No. 271,315.  Patented Jan. 30, 1883.
Fig. 1.
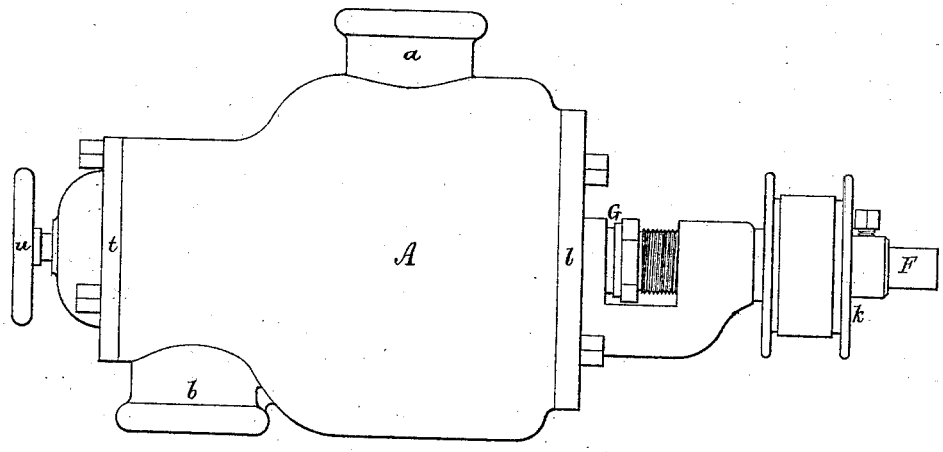
Fig. 2.
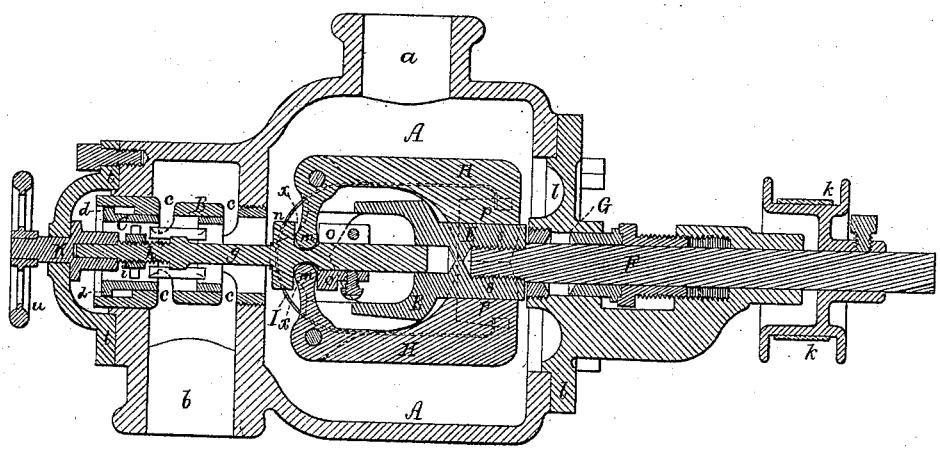
Fig. 4.  Fig. 3.  Fig. 5.  Fig. 6.  Fig. 7.
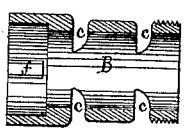 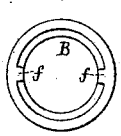  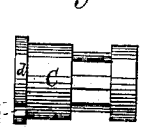 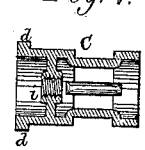
Witnesses.
S. N. Piper
E. S. Pratt
Inventor.
Warren H. Craig.
by R. H. Eddy atty.

(No Model.) 2 Sheets—Sheet 2.

W. H. CRAIG.
STEAM ENGINE GOVERNOR.

No. 271,315. Patented Jan. 30, 1883.

Witnesses:
S. N. Piper
E. B. Pratt

Inventor
Warren H. Craig
by R. H. Eddy, atty.

UNITED STATES PATENT OFFICE.

WARREN H. CRAIG, OF LAWRENCE, MASSACHUSETTS.

STEAM-ENGINE GOVERNOR.

SPECIFICATION forming part of Letters Patent No. 271,315, dated January 30, 1883.

Application filed November 3, 1882. (No model.)

*To all whom it may concern:*

Be it known that I, WARREN H. CRAIG, of Lawrence, in the county of Essex, of the State of Massachusetts, have invented a new and useful Improvement in Steam-Engine Governors; and I do hereby declare the same to be described in the following specification and represented in the accompaniyng drawings, of which—

Figure 1 is a side elevation, and Fig. 2 a longitudinal section, of a governor embodying my invention, the nature of which is defined in the claims hereinafter presented. Figs. 3, 4, 5, 6, 7, 8, 9, 10, and 11 are hereinafter referred to and described.

My invention specially relates to that class of steam-engine governors in which the weighted levers of the rotary shaft and valve-spindle are inclosed within the case of the governor.

In the said drawings, A denotes the case as having an induct, $a$, and an educt, $b$, there being over the latter, and arranged in the case in manner as shown, a tubular valve-seat, B, to receive the tubular valve C. This valve is to slide within the tube B and to close or open more or less its port or ports $c$.

Fig. 3 is an outer end view, and Fig. 4 a longitudinal section, of the valve-seat B, while Fig. 5 is an end view, Fig. 6 a side view, and Fig. 7 a longitudinal section, of the valve. At its outer end the valve has a flange, $d$, provided with guide-notches $e$ $e$ to fit and slide upon guides $ff$, as and arranged as shown within the valve-seat tube.

The valve-spindle shown at $g$ has a screw, $h$, upon it to screw through the hub portion $i$ of the valve, the spindle being adapted to slide and revolve freely within a head or lever-carrier, E, fixed to a shaft, F. The said shaft F, provided with a driving-pulley, $k$, enters the case through a stuffing-box, G, applied to the removable head $l$ of such case.

Figure 8:
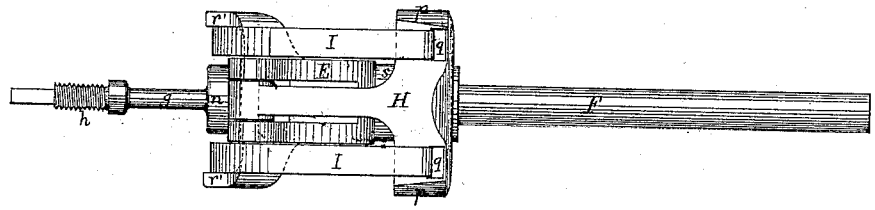
Figure 9:
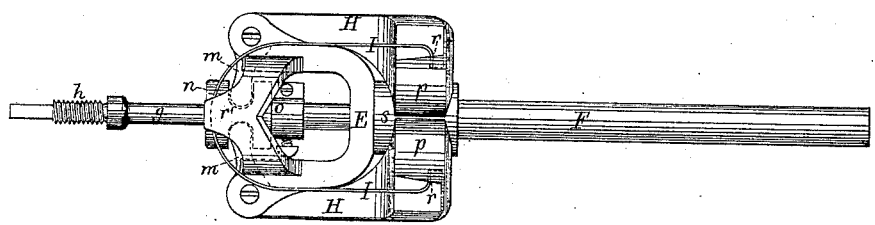
Figure 10:
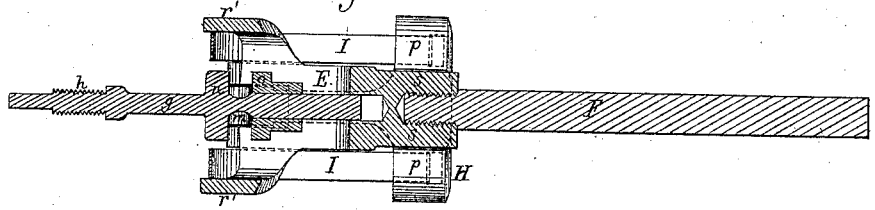
Figure 11:
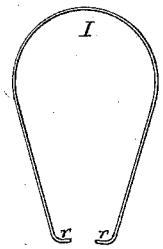

Two weighted knee-levers, H H, are arranged in and fulcrumed to the said head or carrier E, they, with the said carrier, being shown in top view in Fig. 8, in side view in Fig. 9, and in horizontal section in Fig. 10. The shorter arms $m$ of the said levers enter the narrow annular space $x$ between a flange, $n$, and a collar, $o$, fixed on the valve-spindle.

The longer arms of the levers terminate in weights $p$, that have notches or recesses $q$ to receive the bent ends or parts $r$ of two U or bow springs, I, arranged with such levers and their carrier E in manner as represented. A top view of one of these springs I is given in Fig. 11. The said carrier is provided with hooks or projections $r'$, to extend across the springs at their crowns in manner as shown, in order to hold them in connection with the said carriers. Each spring rests also, as represented, on the carrier. When the carrier is in revolution with its shaft the heavier arms of the knee-levers will by centrifugal force be thrown outward from the neck $s$ of the carrier, the elastic force of the springs serving to produce counter motions of the arms on decrease of speed of revolution of the carrier taking place. These movements of the weighted arms of the levers cause the shorter arms of such levers to move so as to slide the valve-spindle and move the valve within its tubular seat.

The guides $ff$, by entering the notches $e$ $e$ of the valve, prevent such valve from revolving within its seat-tube, especially when the spindle may be revolved, in order to properly adjust the valve to the seat-tube as circumstances may require. To effect this revolution of the valve-spindle it is made prismatic at its end, and enters and fits a rotary key, K, adapted to revolve in the head $t$ of the case, and provided with a hand-wheel, $u$.

Instead of the key being applied to turn the spindle of the valve, such key, by suitable devices, may be applied to the tubular valve-seat, which may be made revoluble in the case; but it is preferable to have the valve-seat tube stationary and the key adapted to revolve the valve-spindle.

The pulley of the governor-shaft being put in revolution by an endless belt applied to it and operated by a pulley on some rotary shaft of a steam-engine, and the educt of the governor-case being suitably connected with the valve-chest of the engine, the carrier of the knee-levers will be revolved with and by such governor-shaft. As the speed of the engine may increase beyond a normal rate, the knee-levers will be moved so as to move the valve and lessen the supply of steam to the valve-chest, the levers being moved by the springs so as to effect a counter movement of the valve when the speed of the engine may fall below the normal or fixed rate.

I claim—

1. The knee-levers H, recessed to receive and hold the U-springs at their ends, in combination with the carrier E of such levers, having hooks or projections $r'$ to extend over the springs at their crowns, all being substantially as set forth.

2. The steam-engine governor constructed substantially as described—viz., with its case A chambered and provided with the induct $a$ and educt $b$, arranged as represented, in combination with the tubular valve C and valve-seat B, screw-threaded valve-spindle $g$ and its operative key K, the rotary shaft F, its head or lever-carrier E, and the two weighted knee-levers H and their operative springs I, adapted and arranged in the said case as set forth.

WARREN H. CRAIG.

Witnesses:
R. H. EDDY,
E. B. PRATT.